Figure 1:

March 6, 1962 F. CAMERON 3,023,538
BOBBER DEVICE
Filed Jan. 13, 1960

INVENTOR.
FRANK CAMERON
BY Charles A. Penfold
ATTORNEY

United States Patent Office 3,023,538
Patented Mar. 6, 1962

3,023,538
BOBBER DEVICE
Frank Cameron, 2026 Wayne Trace, Fort Wayne, Ind.
Filed Jan. 13, 1960, Ser. No. 2,243
9 Claims. (Cl. 43—44.95)

This invention relates generally to fishing tackle and more particularly is directed to improvements in a bobber device.

It is recognized that various forms or types of bobber devices are in current use. For example, one type comprises a plastic float provided with a spring-pressed loop or catch for detachably holding a line thereto, while another type includes a wooden staff provided with a slot and a helical spring for releasably detaining a line in the slot.

The types of bobbers above described, including others, have not proven entirely satisfactory under all conditions of use for the reason that the bobber is not positively secured to the line. In other words, such bobbers will either slide outwardly along the line or flip off when the sinker and bait are thrown out into space in fishing. This sliding also occurs when the line is jerked upwardly in response to the biting of the bait by a fish as well as when a fish is caught and being landed.

With the foregoing in mind the principal object of the subject invention is to avoid the disadvantages inherent in bobbers of the type above described and provide a bobber device embodying means whereby the device may be readily and firmly detachably anchored to a line, so that after the device has once been properly secured in place to locate the bait and/or sinker at a pre-determined depth for fishing it will not be necessary to readjust the device.

More particularly, the device embodying the subject invention comprises a staff provided with an elongate inclined cam surface at its lower end, a fitting or cap member secured to the staff, and a helical spring.

The cap includes an annular portion which receives the said end of the staff and a tongue which extends alongside the staff in spaced opposed relationship to the cam surface to define a V-shaped formation for receiving a line. The spring encircles the staff and the tongue and when expanded serves to force the line against the tongue and cam surface as well as against the rim of the cap at circumferentially spaced locations adjacent the base of the tongue to firmly detachably secure the line to the bobber device. The bobber may be readily released from the line by merely retracting the spring away from the tongue so that it may be pulled out of the V-shaped formation.

A specific object of the invention is to design and construct a unique form of fitting or cap adapted for attachment to a staff.

Additional objects and advantages of the invention reside in providing a device which offers advantages with respect to economy in manufacture and assembly, efficiency and durability.

Other objects and advantages of the invention will become apparent after the description hereinafter set forth is considered in conjunction with the drawing annexed hereto.

Figure 2:
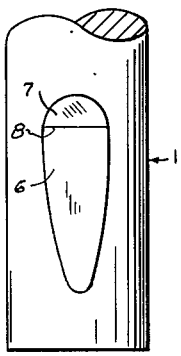
Figure 4:
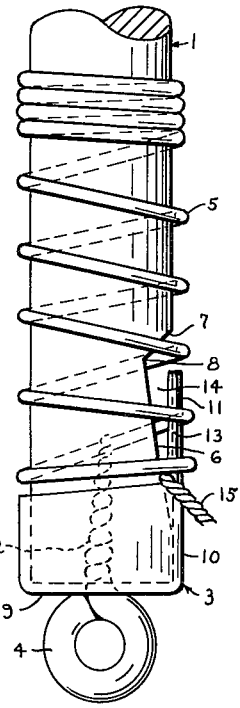
Figure 3:
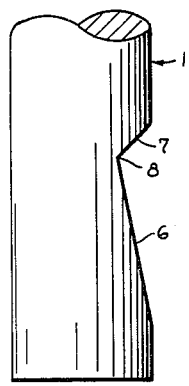
Figure 5:
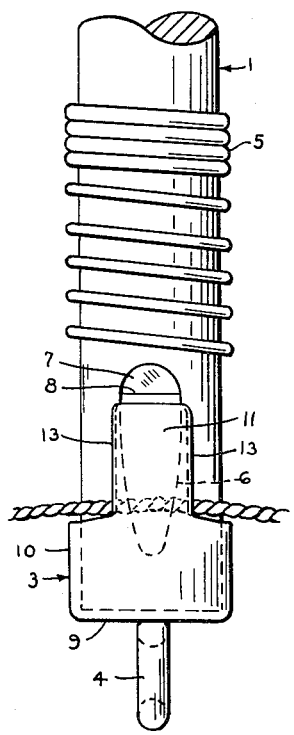
Figure 6:
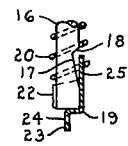
Figure 7:
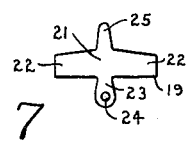

In the drawing:
FIGURE 1 is an elevational view of the bobber device;
FIGURE 2 is an enlarged elevational view of the lower extremity of the staff showing certain characteristics of the cam surface provided thereon;
FIGURE 3 is an enlarged elevational view of the lower end of the staff showing other characteristics of the cam surface;
FIGURE 4 is an enlarged elevational view of the lower end of the bobber device depicting the manner in which it is attached to a line;
FIGURE 5 is a view similar to FIGURE 4, illustrating the manner in which the device can be readily released from the line;
FIGURE 6 is a partial view of a modified form of fitting or cap as applied to a staff; and
FIGURE 7 is a surface development of the fitting or cap as shown in FIGURE 6.

Referring first to the structure exemplified in FIGURES 1 through 5 of the drawing, the bobber device embodying the subject invention comprises a staff generally designated 1, a float 2 secured to the staff between its ends, a fitting or cap generally designated 3, means 4 preferably in the form of a screw eye for fastening the cap to the staff, and a helical spring 5 secured to the staff.

The staff may be designed and constructed in various ways and out of any material suitable for the purpose but is preferably constructed from wood and made cylindrical in shape except for its upper extremity which is tapered. The lower extremity of the staff is preferably notched to provide an elongate inclined planar cam surface 6 and an adjacent inclined planar surface 7. The cam surface 6 gradually increases in width from a point longitudinally spaced from the lower end of the staff and is inclined toward its longitudinal axis and the surface 7 gradually increases in width from an inner point on the staff and extends toward the longitudinal axis of the shaft and intersects the cam surface 6 on a line 8. In other words, the surfaces 6 and 7 are planar and define an oblique or obtuse angle as best depicted in FIGURES 3 and 4.

The cap or fitting 3, above referred to, is preferably made in the form of a cup having a base wall 9 and an annular wall 10 provided with an integral elongate resilient tongue 11 which is disposed opposite the cam surface 6. The cap embraces the lower extremity of the staff and is preferably secured thereto by inserting a threaded end 12 of the screw eye 4 through a hole provided therefor in the base wall of the cap and threading it into the end of the staff for detachably securing the cap in place. The eye serves as an abutment which engages the outer surface of the base wall of the cap for firmly connecting the cap to the staff and also affords an additional means whereby the device may be readily attached to a line by threading it through the eye in lieu of utilizing the spring and cap for such purpose.

The tongue 11 extends longitudinally alongside the staff and is arcuate in cross-section to provide a pair of corresponding longitudinally extending marginal edges 13 which are disposed in a predetermined spaced opposed relationship to the cam surface 6 so that the tongue and/or these edges and the cam surface define a tapered or V-shaped formation 14 which constitutes a means for receiving a line 15.

Resiliently flexible means preferably in the form of the helical spring 5, above referred to, surrounds the staff for holding the line to the device. More specifically in this respect the inner end of the spring is preferably grippingly secured to the staff at a location spaced appreciably inward from the surface 7 so that its outer free extremity normally surrounds the staff and the tongue and engages the inner rim edge of the annular wall 10 of the cap. This free extremity of the spring which detachably locks the device to the line may be telescoped or moved longitudinally on the shaft and also serves to stabilize the position of the tongue and prevent accidental outward distortion thereof.

Attention is directed to the fact that the cam surface 6 on the staff extends into the annular portion of the cap so as to insure that the line will engage the rim of the cap. It will also be noted that the rim of the cap provides an arcuate surface or edge and that the longitudinal marginal edges 13 or arrises of the tongue intersect this edge. It will be further noted that the rim of the cap is inclined away from the tongue to provide clearance so as to further insure a good binding action of the spring against the line. In other words, the rim and the marginal edges of the tongue are disposed in a predetermined relationship with respect to one another and the cam surface so that the free extremity of the spring will force the line against the rim as well as between the cam surface 6 and the marginal edges of the tongue, so that the line is wedged and clamped at a plurality of circumferentially spaced locations about the longitudinal axis of the staff as best exemplified in FIGURE 4. The line can be readily inserted or removed from the V-shaped formation 14 by merely retracting the free extremity of the spring toward the float until it clears the free end of the tongue, as illustrated in FIGURE 5. The surface 7 on the staff assists in guiding or piloting the line into the formation. The device may be readily adjusted along the line without removing the device therefrom by merely retracting the spring sufficiently to free the line after which the device may be slid therealong to the desired location, after which the spring can be released so that it will again force the line into engagement with the components in the manner above referred to.

The modified structure exemplified in FIGURES 6 and 7 of the drawing comprises a staff 16 provided with a notch having surfaces 17 and 18 which respectively correspond to the surfaces 6 and 7 above referred to. A fitting or cap generally designated 19 is attached to the lower end of the staff in a unique manner and a helical spring 20, like the spring 5 is carried by the staff.

The fitting 19 is preferably constructed from a piece of sheet material to define a body 21 having a pair of wing portions 22, a head 23 provided with an aperture 24, and a tapered tail portion 25. The fitting is formed into tubular shape so that it will embrace the staff, with the wing portions being clamped thereagainst to firmly anchor the fitting as depicted in FIGURE 6. The head 23 is formed so that a portion thereof overlies the end of the staff and a portion extends centrally and axially thereof so as to facilitate threading a line through the aperture. It will be noted that the marginal edges of the wing portions 22 facing toward the tongue are inclined with respect to the longitudinal axis of the fitting in order to provide clearance so that the line will be efficiently clamped against such edges.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A bobber device of the kind described comprising a staff provided with a cam surface extending lengthwise of the staff, a fitting stationarily secured to an end of the staff and provided with a tongue extending lengthwise of the staff in spaced opposed relationship to the cam surface, and a helical spring having one end secured to the staff and a free extremity slidably encircling the staff and tongue for releasably holding a line between said cam surface and said tongue.

2. A bobber device of the kind described comprising a staff, a fitting secured about one end of the staff, a float secured to the staff in spaced relationship to the fitting, said fitting being provided with a continuation extending alongside the staff in a direction toward the float, and a helical spring having one end secured to the staff adjacent to the float and a free extremity surrounding the staff and continuation for telescoping movement relative to the staff and continuation for clamping a line between the continuation and staff.

3. A bobber device of the kind described comprising a staff provided with an inclined surface adjacent one end thereof, a cap stationarily secured to said one end and provided with an arcuate rim disposed in a plane transverse to the longitudinal axis of the staff, said cap also being provided with a tongue extending lengthwise of the staff and provided with a pair of longitudinally extending marginal edges located in opposed spaced relation to said inclined surface to define therewith a V-shaped formation for receiving a line, and a helical spring secured to the staff and having a movable portion surrounding the staff and the tongue for urging the line into engagement with said inclined surface, arcuate rim and longitudinal edges of the tongue for securing the line to the bobber.

4. A bobber device comprising a staff, a float carried by the staff, said staff being provided with an elongate cam surface disposed intermediate its length in a plane inclined with respect to the longitudinal axis of the staff, and a fitting secured to the staff provided with a tongue extending alongside the staff and arranged opposite said surface and defining therewith a V-shaped formation for receiving and holding a line.

5. The device set forth in claim 4, including means carried by the staff for detachably locking a line in the formation.

6. A bobber device comprising a staff, a cap receiving one end of the staff, a screw eye extending through the cap and into the said end of the staff for securing the cap thereto, means extending from the cap and alongside the staff to define in combination therewith an elongate recess for receiving a line, and means slidable on the staff for detachably holding the line in the recess.

7. A bobber device comprising a staff, a fitting secured to one end of the staff, and a helical spring having one end secured to the staff at a location spaced longitudinally from said fitting and a free end slidable on the staff in a direction toward said fitting for clamping a line between this free end and said fitting.

8. A bobber device comprising a staff, a fitting having portions embracing and clamping the staff, said fitting also having a fixed tongue portion extending alongside the staff and forming therewith a formation for receiving a line, and a helical spring connected to the staff for detachably clamping the line in said formation.

9. A bobber device comprising a staff, a float secured to said staff at a location intermediate its ends, one end of said staff being provided with a surface extending longitudinally thereof and inclined with reference to the longitudinal axis of the staff, and a fitting having wall structure embraceably secured to said staff end, said fitting being provided with a portion extending longitudinally beyond said staff end and having an aperture therein, said fitting also being provided with a continuation extending along the side of said staff end in opposed spaced relation to said surface to define in combination therewith a V-shaped formation for receiving a line.

References Cited in the file of this patent

UNITED STATES PATENTS

| | | |
|---|---|---|
| 1,980,302 | Taylor | Nov. 13, 1934 |
| 2,103,451 | Durham | Dec. 28, 1937 |
| 2,127,667 | Pflueger | Aug. 23, 1938 |
| 2,842,888 | Landrum | July 15, 1958 |
| 2,863,254 | Kercher | Dec. 9, 1958 |

FOREIGN PATENTS

| | | |
|---|---|---|
| 8,101 | Great Britain | Apr. 7, 1902 |